(12) United States Patent
Ogawa et al.

(10) Patent No.: US 8,695,954 B2
(45) Date of Patent: Apr. 15, 2014

(54) VIBRATION ABSORPTION DEVICE

(75) Inventors: Kazuya Ogawa, Yokohama (JP);
Michihiro Orikawa, Yokohama (JP);
Akio Shimamura, Yokohama (JP);
Hiroshi Kojima, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 135 days.

(21) Appl. No.: 13/266,678

(22) PCT Filed: Apr. 27, 2010

(86) PCT No.: PCT/JP2010/057495
§ 371 (c)(1),
(2), (4) Date: Dec. 20, 2011

(87) PCT Pub. No.: WO2010/126060
PCT Pub. Date: Nov. 4, 2010

(65) Prior Publication Data
US 2012/0091640 A1    Apr. 19, 2012

(30) Foreign Application Priority Data
Apr. 28, 2009  (JP) ................. 2009-109264

(51) Int. Cl.
*F16F 5/00* (2006.01)
(52) U.S. Cl.
USPC .................................. 267/140.13
(58) Field of Classification Search
USPC .................. 267/140.13, 140.14, 140.15
See application file for complete search history.

(56) References Cited

U.S. PATENT DOCUMENTS

| | | | | |
|---|---|---|---|---|
| 4,834,348 A | * | 5/1989 | Jordens et al. | 267/140.13 |
| 8,308,147 B2 | * | 11/2012 | Kojima et al. | 267/140.12 |
| 2009/0026670 A1 | | 1/2009 | Kojima et al. | |
| 2009/0283945 A1 | * | 11/2009 | Kojima et al. | 267/140.13 |
| 2010/0096787 A1 | * | 4/2010 | Kojima | 267/140.13 |

FOREIGN PATENT DOCUMENTS

| | | | |
|---|---|---|---|
| JP | 06207637 A | * | 7/1994 |
| JP | 2006-125617 A | | 5/2006 |
| JP | 2007-278399 A | | 10/2007 |
| JP | 2008-111543 A | | 5/2008 |
| JP | 2008-164116 A | | 7/2008 |

OTHER PUBLICATIONS

International Search Report for PCT/JP2010/057495 dated May 25, 2010.

* cited by examiner

*Primary Examiner* — Thomas J Williams
(74) *Attorney, Agent, or Firm* — Sughrue Mion, PLLC (57) ABSTRACT

A vibration absorption that is both capable of damping vibrations in two directions and high in durability. A pair of pressure receiving chambers (102A) and (102B) at symmetrical positions sandwiching an axis S are structured between a first rubber elastic body (24) and a second rubber elastic body (38). The shape of a first rubber elastic body (18) in an unloaded state is determined such that a region between an inner side joining portion (24B) and an outer side joining portion (24A) becomes substantially horizontal in a loaded state in which the first rubber elastic body (24) supports the weight of an engine.

6 Claims, 4 Drawing Sheets

VIBRATION ABSORPTION DEVICE

CROSS REFERENCE TO RELATED APPLICATIONS

This application is a National Stage of International Application No. PCT/JP2010/057495 filed on Apr. 27, 2010, which claims priority from Japanese Patent Application No. 2009-109264, filed on Apr. 28, 2009, the contents of all of which are incorporated herein by reference in their entirety.

TECHNICAL FIELD

The present invention relates to a sealed liquid type vibration absorption device that prevents the transmission of vibrations from a member that generates vibrations, and particularly relates to a vibration absorption device to be appropriately used at an engine mount of an automobile or the like.

BACKGROUND ART

In a vehicle such as a car or the like, a vibration absorption device that serves as an engine mount is disposed between an engine, which is a vibration generating portion, and a vehicle body, which is a vibration receiving portion. This vibration absorption device is a structure that absorbs vibrations generated from the engine and inhibits transmission of the vibrations to the vehicle body.

For example, in Patent Reference 1, a vibration absorption device is recited in which a first elastic body and a second elastic body are disposed between an outer cylinder fitting and a mounting fitting, and a first cavity portion and a second cavity portion are formed between the elastic bodies. Vibrations in two directions may be damped by liquid moving between the first cavity portion and the second cavity portion.

In a vibration absorption with this structure, if the first elastic body is subjected to tensile deformation in a state in which a load (weight) acts from an engine, durability of the first elastic body falls.

Patent Reference 1: Japanese Patent Application Laid-Open (JP-A) No. 2007-278399

DISCLOSURE OF INVENTION

Technical Problem

In consideration of the situation described above, an object of the present invention is to provide a vibration absorption device that is both capable of damping vibrations in two directions and high in durability.

Solution to Problem

The present invention includes: a first mounting member joined to one of a vibration generating portion and a vibration receiving portion, the first mounting member being formed in a substantially tubular shape; a second mounting member joined to the other of the vibration generating portion or the vibration receiving portion, the second mounting member being disposed at an inner periphery side of the first mounting member; a first elastic body elastically joined to the first mounting member and the second mounting member; a second elastic body disposed between the second mounting member and the first elastic body; a pair of pressure receiving chambers arrayed in a direction orthogonal to an axial direction of the first mounting member, between the first elastic body and the second elastic body, liquid being sealed in the pressure receiving chambers and internal volumes thereof changing in accordance with elastic deformations of the first elastic body; a primary chamber in which liquid is sealed, a portion of a wall thereof being structured by the second elastic body; a secondary chamber, a portion of a wall of which is structured by a diaphragm member and in which liquid is sealed, an internal volume of the secondary chamber being capable of expanding and contracting in accordance with changes in liquid pressure; a partition member provided between the primary chamber and the secondary chamber; a first restriction channel that enables movements of liquid between the primary chamber and the secondary chamber; and a second restriction channel that enables movements of liquid between each of the pressure receiving chambers and the secondary chamber, wherein in an unloaded state, in which the first mounting member and the second mounting member are not joined to the vibration generating portion and the vibration receiving-portion, an inner side joining portion that is a region of joining to the second mounting member of the first elastic body is disposed, relative to an outer side joining portion that is a region of joining to the first mounting member of the first elastic body, at the opposite direction to a direction of loading in a loaded state, in which the first mounting member and the second mounting member are joined to the vibration generating portion and the vibration receiving portion.

In this vibration absorption device, when a vibration is transmitted to the either one of the first mounting member and the second mounting member, the first elastic body elastically joining between the first mounting member and the second mounting member elastically deforms and the second elastic member disposed between the second mounting member and the first elastic body also elastically deforms. The vibration is absorbed by a vibration absorption action based on internal friction of the elastic bodies or the like, and a vibration that is transmitted to the vibration receiving portion is reduced. Whether the input vibration is, for example, a vibration in a primary amplitude direction that substantially coincides with the axial direction of the first mounting member or a vibration in a secondary amplitude direction that is substantially orthogonal to the primary amplitude direction, a portion of the vibration is absorbed by the damping effect of the elastic bodies.

Movement of the liquid between the primary chamber and the secondary chamber is enabled by the first restriction channel. When a vibration in the primary amplitude direction is inputted, the internal volume of the primary chamber changes in accordance with elastic deformation of the second elastic body and some of the liquid moves between the primary chamber and the secondary chamber. Due to, for example, a channel length, cross-sectional area and the like of the first restriction channel being suitably specified, resonance may be generated in the liquid and the input vibration in the primary amplitude direction (the primary amplitude direction) may be effectively absorbed.

Movement of the liquid between each of the pressure receiving chambers and the secondary chamber is enabled by the second restriction channel. When a vibration in the secondary amplitude direction is inputted, the internal volumes of the pressure receiving chambers change and some of the liquid moves between the pressure receiving chambers and the secondary chamber. Here, the pair of pressure receiving chambers are arranged in the direction orthogonal to the axial direction of the first mounting member. Therefore, due to, for example, channel lengths, cross-sectional areas and the like of the second restriction channels being suitably specified, resonance may be generated in the liquid and the input vibration in the secondary amplitude direction (the primary amplitude direction) may be effectively absorbed.

In this vibration absorption device, in the unloaded state in which no load (weight) is acting from an engine or the like, the inner side joining portion of the first elastic body, which is the region of joining thereof to the second mounting member, is disposed at the opposite direction relative to the outer side joining portion from the loading direction side thereof, which outer side joining portion is the region of joining to the first mounting member. Hence, in the loaded state in which a load acts from an engine or the like, the first elastic body is compressed between the outer side joining portion and the inner side joining portion. Thus, compared with a vibration absorption device with a structure in which a portion between an outer side joining portion and an inner side joining portion is subjected to tensile deformation, durability of the first elastic body is improved and durability of the vibration absorption device itself is raised.

In the present invention, an extension angle in the unloaded state of a region of extension of the first elastic body, which extends from the inner side joining portion to the outer side joining portion, is determined such that the region of extension is orthogonal to the axial direction of the first mounting member in the loaded state.

Thus, by the region of extension that reaches from the inner side joining portion to the outer side joining portion of the first elastic body being made orthogonal to the axial direction in the loaded state, the region of extension may be put into a maximally compressed state, and durability may be further improved.

The present invention may be configured to further include: a broad diameter portion that is provided at the second mounting member and broadens in diameter to the radial direction outer side at the opposite side of the second elastic body from the side thereof at which the diaphragm member is disposed; and a cover portion that is continuous from the first elastic body and covers the broad diameter portion.

That is, a rebound stopper that limits the movement range of the first elastic body and the second elastic body may be structured by the broad diameter portion and the cover portion. Because the cover portion is continuous from the first elastic body and covers the broad diameter portion integrally with the first elastic body, the rebound stopper may be structured with an increase in costs being restrained.

The present invention may be configured to further include: a dividing wall portion that is disposed along a radial direction of the first mounting member, that is structured integrally with either one of the first elastic body and the second elastic body, and that divides up a cavity between the first elastic body and the second elastic body and structures the pair of pressure receiving chambers; and a retention portion that is structured integrally with the other of the first elastic body and the second elastic body and that abuts so as to enclose the outer sides of the dividing wall portion.

Thus, even if a vibration that would greatly deform the dividing wall portion is inputted to the vibration absorption device, the dividing wall portion may deform relatively freely and concentrations of stress may be moderated.

Moreover, the dividing wall portion is retained by the retention portion that abuts against so as to enclose and retain the outer sides of the dividing wall portion. Therefore, the susceptibility of particular portions of the dividing wall portion to damage may be suppressed by deformation of those portions or the like.

The dividing wall portion may be a ridge along the radial direction, and the retention portion may be two ridge portions along the radial direction that sandwich the dividing wall portion from width direction outer sides of the dividing wall portion.

Thus, damage to the dividing wall portion may be suppressed by the dividing wall portion formed as a ridge being sandwiched by the retention portion.

The dividing wall portion may be a ridge along the radial direction with an arc-shaped cross-section, and the retention portion may be a recessed groove along the radial direction with an arc-shaped cross-section that corresponds with a distal end portion of the dividing wall portion.

Thus, by the ridge of the dividing wall portion being formed with an arc-shaped cross-section and the groove in the retention portion also being formed with an arc-shaped cross-section, concentrations of stress on particular portions may be moderated and damage to the dividing wall portion may be suppressed.

The second elastic body may be lower in hardness than the first elastic body. In this case, because the second elastic body is susceptible to damage by deformation, a structure that includes the above dividing wall portion and retention portion may be employed as appropriate.

Advantageous Effects of Invention

Because the present invention has the configuration described above, a vibration absorption that is both capable of damping vibrations in two directions and high in durability may be obtained.

BEST MODE FOR CARRYING OUT THE INVENTION

Herebelow, a vibration absorption device relating to an exemplary embodiment of the present invention is described with reference to the drawings. In the drawings, the symbol S indicates an axis of the device, and descriptions are given below with the direction along the axis S being the axial direction of the device.

Figure 1:
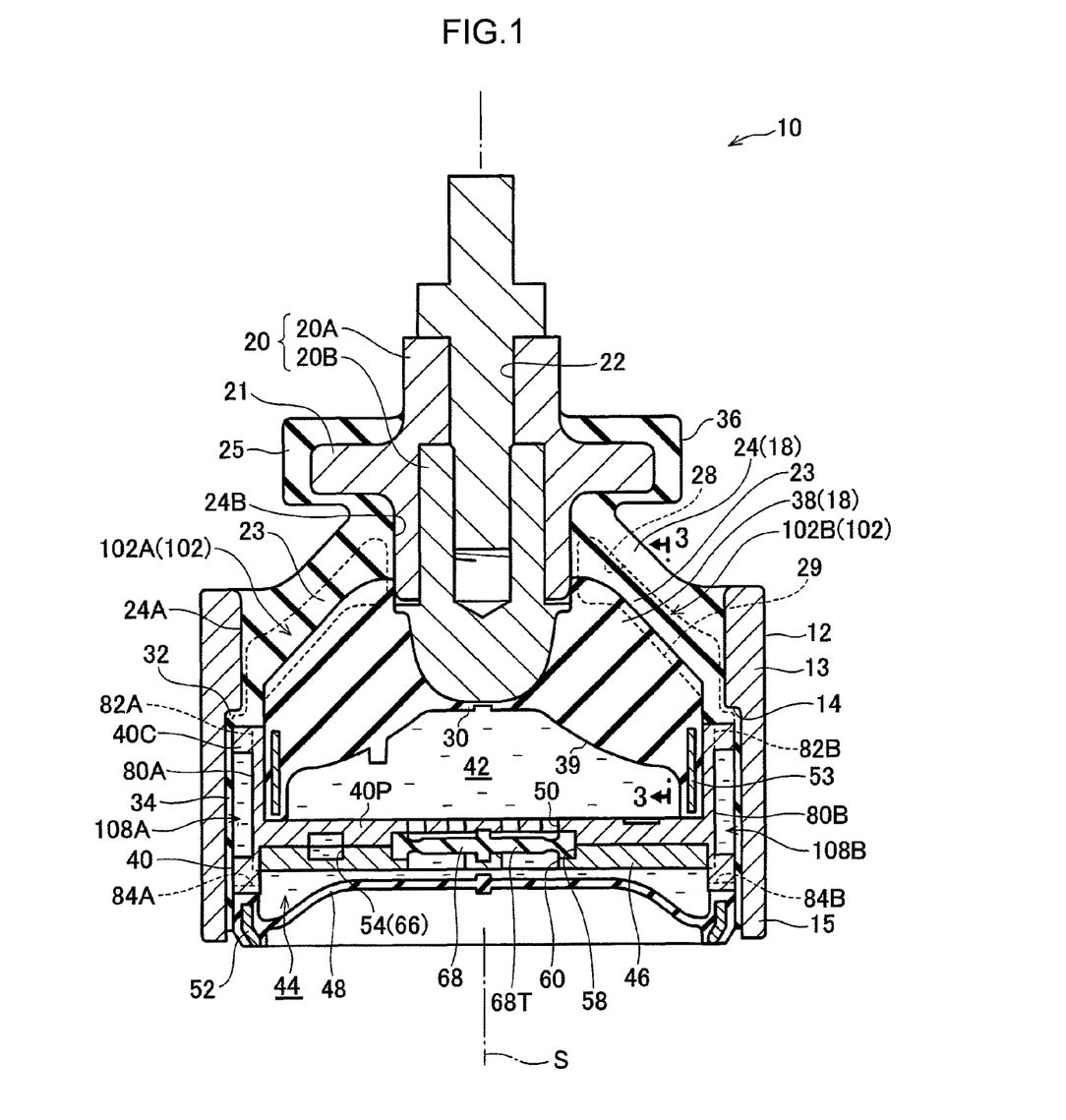
FIG. 1 shows a sectional diagram, cut along an axial direction, illustrating structure of an vibration absorption device relating to a first exemplary embodiment of the present invention in an unloaded state.
Figure 2:
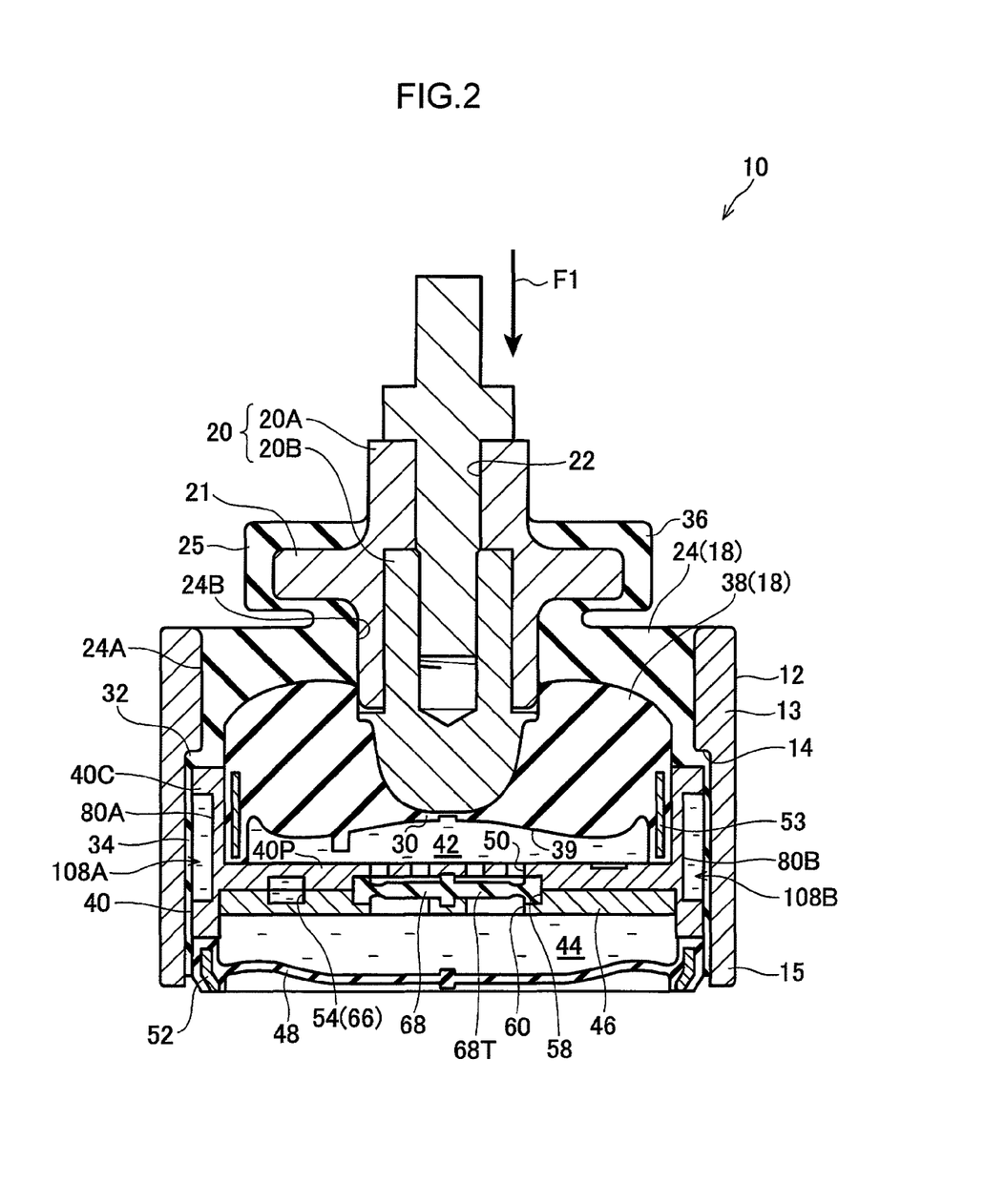
FIG. 2 shows a sectional diagram, cut along the axial direction, illustrating the structure of the vibration absorption device relating to the first exemplary embodiment of the present invention in a loaded state.

A vibration absorption device 10 of a first exemplary embodiment of the present invention is illustrated in FIG. 1 and FIG. 2. As illustrated in FIG. 1, an outer cylinder fitting 12 formed in a substantial cylindrical shape is provided at an outer periphery side of the vibration absorption device 10, and a mounting fitting 20 is provided substantially coaxially at the inner periphery side of the outer cylinder fitting 12. The outer cylinder fitting 12 is fitted into a cap-shaped holder fitting (not illustrated) and the vibration absorption device 10 is joined to a vehicle body of a vehicle via the holder fitting. A step portion 14 is formed at an axial direction middle portion of an inner periphery face of the outer cylinder fitting 12. A portion above the step portion 14 serves as a small diameter portion 13, whose inner diameter is relatively smaller, and a portion below the step portion 14 serves as a large diameter portion 15, whose inner diameter is relatively larger.

The mounting fitting 20 is structured by two components, an upper mounting fitting 20A and a lower mounting fitting 20B. The mounting fitting 20 is assembled to be integrated by the lower mounting fitting 20B being pushed into or fitted to the upper mounting fitting 20A or the like. Overall, the upper end side of the mounting fitting 20 (the upper mounting fitting 20A) is formed in a circular rod shape with a substantially constant outer diameter and the lower end side of the mounting fitting 20 (the lower mounting fitting 20B) is formed substantially in a truncated circular cone shape whose outer diameter decreases in a downward taper. A threaded hole 22 is formed downward along the axis S from the upper end face of the mounting fitting 20. The vibration absorption device 10 is joined and fixed to an engine of the vehicle via a fastening member, such as a bolt that is screwed into the threaded hole 22 of the mounting fitting 20 or suchlike, and a bracket stay.

A broad diameter portion 21 with a substantial circular plate shape is formed to extend locally in the radial direction at the upper end side of the mounting fitting 20, that is, from the outer periphery face of the upper mounting fitting 20A. As described below, rubber constituting a first rubber elastic body 24 is provided extending upward and the broad diameter portion 21 is covered by a cover portion 25.

The first rubber elastic body 24 is provided in the vibration absorption device 10 between the outer cylinder fitting 12 and the mounting fitting 20. The first rubber elastic body 24 is formed over the truncated cone in a substantial ring shape with a large thickness. A second rubber elastic body 38 is provided between the mounting fitting 20 and the first rubber elastic body 24, so as to be disposed below the first rubber elastic body 24. The second rubber elastic body 38 is formed over the truncated cone in a substantial ring shape with a large thickness. Herebelow, where suitable the first rubber elastic body 24 and the second rubber elastic body 38 are collectively referred to as a rubber elastic body 18.

An outer periphery face of the first rubber elastic body 24 serves as an outer side joining portion 24A. The first rubber elastic body 24 is adhered by vulcanization and joined to the upper side of the inner periphery face of the outer cylinder fitting 12 by this outer side joining portion 24A. An inner periphery face of the first rubber elastic body 24 serves as an inner side joining portion 24B. The first rubber elastic body 24 is adhered by vulcanization and joined to the lower end side of the outer periphery face of the upper mounting fitting 20A of the mounting fitting 20 by this inner side joining portion 24B. Thus, the first rubber elastic body 24 is elastically joined to the outer cylinder fitting 12 and the mounting fitting 20.

As illustrated in FIG. 1, in an unloaded state in which the vibration absorption device 10 is not supporting a load from the engine, the first rubber elastic body 24 is formed in a shape that is angled and spreads downward from the mounting fitting 20 to the outer cylinder fitting 12 in the section of FIG. 1. Therefore, a lower face central portion of the first rubber elastic body 24 is formed substantially in a truncated circular cone shape whose inner diameter narrows from below to above.

The cover portion 25 of the first rubber elastic body 24 extends upward from an upper end outer periphery portion of the first rubber elastic body 24, and is adhered by vulcanization to cover the upper mounting fitting 20A from the broad diameter portion 21 to a portion further thereabove. A bound stopper 36 is constituted by the broad diameter portion 21 and the cover portion 25. The bound stopper 36 is disposed above the rubber elastic body 18 and is formed such that, when the rubber elastic body 18 moves relatively upward with respect to the outer cylinder fitting 12, the rubber elastic body 18 touches against the bound stopper 36 and movement of the rubber elastic body 18 is limited.

A step portion 32 is formed integrally at the first rubber elastic body 24. The step portion 32 is disposed along the step portion 14 of the outer cylinder fitting 12. A lower face side of this step portion 32 is formed as a flat face. A covering portion 34 is integrally formed at the first rubber elastic body 24 in the shape of a circular tube with thin walls. The covering portion 34 extends downward from a lower end outer periphery portion of the step portion 32. The covering portion 34 is adhered by vulcanization to the outer cylinder fitting 12 so as to cover the lower end side of the inner periphery face of the outer cylinder fitting 12.

In the unloaded state illustrated in FIG. 1, in the section of FIG. 1 the second rubber elastic body 38 is formed in a shape that is angled and spreads downward from the mounting fitting 20 to the inner periphery face of an orifice tube portion 40C, which is described below. Thus, a recess portion 39 with a substantial truncated circular cone shape whose inner diameter narrows from below to above is formed at the lower face central portion of the second rubber elastic body 38.

An upper portion of the outer periphery face of the second rubber elastic body 38 is bonded by pressure to a lower portion of the first rubber elastic body 24. A metal ring 53 is embedded in a lower portion of the second rubber elastic body 38, and a lower portion of the outer periphery face of the second rubber elastic body 38 is bonded by pressure to the inner periphery face of the below-described orifice tube portion 40C. An inner cushion portion 30 is integrally formed at a lower end inner periphery portion of the second rubber elastic body 38. The inner cushion portion 30 covers a lower end portion of the mounting fitting 20.

Figure 3:
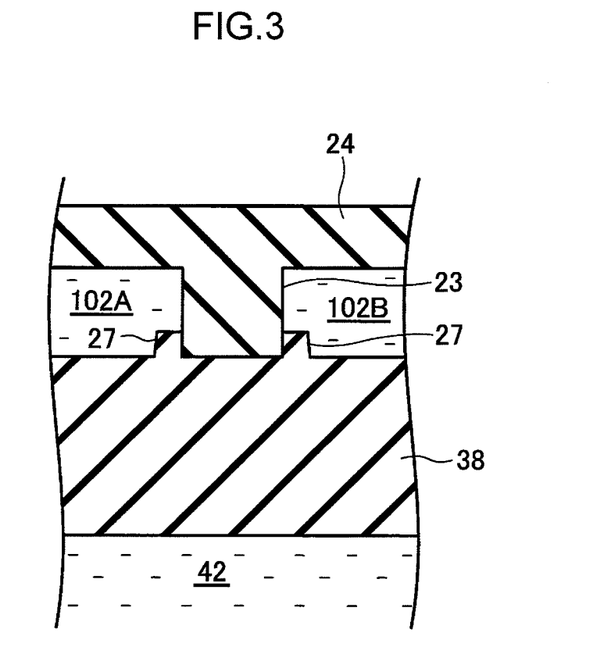
FIG. 3 shows a sectional diagram, cut along line 3-3 of FIG. 1, illustrating a joining structure between a first rubber elastic body and a second rubber elastic body of the vibration absorption device relating to the first exemplary embodiment of the present invention.

As illustrated in FIG. 1, the first rubber elastic body 24 and the second rubber elastic body 38 are set apart from one another and a pressure receiving chamber 102 is structured between the first rubber elastic body 24 and the second rubber elastic body 38. As illustrated in FIG. 3, the pressure receiving chamber 102 is divided into a pressure receiving chamber 102A and a pressure receiving chamber 102B by dividing wall portions 23. These pressure receiving chambers 102A and 102B symmetrically sandwich the axis S in a plan view of the vibration absorption device 10, that is, if viewed along the axis S. The pressure receiving chambers 102A and 102B are filled with a liquid such as ethylene glycol, silicon oil or the like. In essence, the first rubber elastic body 24 operates as a lid that covers the pressure receiving chambers 102A and 102B from above.

The material of a rubber that forms the first rubber elastic body 24 and the material of a rubber that forms the second rubber elastic body 38 can be expected to be rubbers of the same kind as one another, but they may be formed of respectively different rubber materials. In such a case, a rubber with a lower hardness than the rubber that forms the second rubber elastic body 38 is selected for the rubber that forms the first rubber elastic body 24.

Each dividing wall portion 23 is made of rubber and structured integrally with the first rubber elastic body 24. As illustrated in FIG. 3, the dividing wall portion 23 is provided at the lower face of the first rubber elastic body 24 in a protruding shape along the radial direction, so as to divide up the gap between the first rubber elastic body 24 and the second rubber elastic body 38. The lower end of the dividing wall portion 23, which is to say a distal end portion of the dividing wall portion 23 at the second rubber elastic body 38 side thereof, is abutted against the second rubber elastic body 38.

Outer faces of both sides in a width direction of the dividing wall portion 23 are nipped by retention portions 27. The retention portions 27 are structured integrally with the second rubber elastic body 38, at the upper face of the second rubber elastic body 38. The retention portions 27 are structured as a pair of two protrusions so as to nip the dividing wall portion 23 at the two width direction sides thereof. Because the dividing wall portion 23 is nipped by the retention portions 27, the dividing wall portion 23 is retained at a predetermined position at a lower end portion of the dividing wall portion 23, that is, a portion of the dividing wall portion 23 that is close to the second rubber elastic body 38. Thus, the pressure receiving chamber 102 may be assuredly divided into the pressure receiving chamber 102A and the pressure receiving chamber 102B.

An orifice member 40 is disposed at the inner side of the outer cylinder fitting 12 so as to be disposed at the lower side of the rubber elastic body 18. A partition member 46 is disposed below the orifice member 40, and a diaphragm member 48 is disposed below the partition member 46. The diaphragm member 48 is formed of a rubber material in a thin circular plate shape. A metal ring 52 is embedded at the outer periphery of the diaphragm member 48. In the state in which the orifice member 40 and the partition member 46 are accommodated in the outer cylinder fitting 12, the diaphragm member 48 is disposed such that the metal ring 52 is disposed at the inner periphery side of a caulking portion 16 of the outer cylinder fitting 12. The caulking portion 16 is inflected so as to decrease in diameter from the upper end side to the lower end side thereof. Thus, the orifice member 40, partition member 46 and diaphragm member 48 inside the outer cylinder fitting 12 are fixed between the step portion 32 and the caulking portion 16.

A substantially cylindrical cavity (liquid chamber cavity) is structured inside the outer cylinder fitting 12. The upper end side of the chamber cavity is closed off by the second rubber elastic body 38 and the lower end side of the chamber cavity is closed off by the diaphragm member 48. The chamber cavity is divided into a primary chamber 42 and a secondary chamber 44. The second rubber elastic body 38 and the orifice member 40 serve as portions of walls of the primary chamber 42, and the partition member 46 and the diaphragm member 48 serve as portions of walls of the secondary chamber 44. A liquid such as water, ethylene glycol or the like is charged into the primary chamber 42 and into the secondary chamber 44.

The internal volume of the primary chamber 42 may change (expand and contract) in accordance with elastic deformation of the rubber elastic body 18, and the diaphragm member 48 may be deformed by suitably small loads (pressures) in the direction of expanding and contracting the internal volume of the secondary chamber 44.

The orifice member 40 is provided with a circular plate portion 40P, which is formed in a substantial circular plate shape, and the tubular orifice tube portion 40C, which extends in the axial direction from the periphery of the circular plate portion 40P. The partition member 46, which is similarly formed in a circular plate shape, is disposed at the lower face side of the circular plate portion 40P. An annular channel portion 54 is formed in the circular plate portion 40P and the partition member 46, along a circumferential direction centered on the axis S, over nearly one circumference thereof. One end portion of the channel portion 54 opens out at the upper face of the circular plate portion 40P and the other end portion opens out at the lower face of the partition member 46. Thus, the interior of the channel portion 54 communicates between the primary chamber 42 and the secondary chamber 44. In other words, a first orifice 66, which is a restriction channel that allows liquid communication between the primary chamber 42 and the secondary chamber 44, is formed by the channel portion 54.

The circular plate portion 40P is disposed to be superposed with the partition member 46, and substantially serves as a partition member of the present invention.

A circular recess portion 58 is formed in the opposing faces of the partition member 46 and the circular plate portion 40P, at the inner periphery side of the channel portion 54. Plural aperture portions 50 and plural aperture portions 60 are formed at this recess portion 58. The aperture portions 50 penetrate to the top face of the circular plate portion 40P, and the aperture portions 60 penetrate to the bottom face of the partition member 46. A movable plate 68 is accommodated in the recess portion 58. The movable plate 68 is formed in a circular plate shape, and a thin portion 68T is formed at portions of the movable plate 68 at which the thickness is reduced. The aperture portions 50 and 60 are formed at positions that correspond with the thin portion 68T.

The dimension of the outer diameter of the orifice tube portion 40C is set to correspond with the inner diameter of the covering portion 34 of the first rubber elastic body 24. Two outer periphery channels 80A and 80B are formed in the outer periphery of the orifice tube portion 40C, traversing approximately half the circumference. Upper side communication apertures 82A and 82B and lower side communication apertures 84A and 84B are formed in the partition member 46. The upper side communication apertures 82A and 82B penetrate upward from respective upper end portions of the outer periphery channels 80A and 80B, and the lower side communication apertures 84A and 84B penetrate downward from respective other end portions of the outer periphery channels 80A and 80B.

The outer periphery sides of the outer periphery channels 80A and 80B are closed off by the inner periphery face of the cover portion 25. The outer periphery channels 80A and 80B whose outer periphery sides are closed off constitute, together with the upper side communication apertures 82A and 82B and the lower side communication apertures 84A and 84B of the orifice tube portion 40C of the partition member 46, second orifices 108A and 108B that reciprocally allow liquid communication between the secondary chamber 44 and the pressure receiving chambers 102A and 102B. The second orifices 108A and 108B allow the liquid to reciprocally flow between the pressure receiving chambers 102A and 102B and the secondary chamber 44. Therefore, the liquid may move from the pressure receiving chamber 102A to the pressure receiving chamber 102B via the second orifice 108A, the secondary chamber 44 and the second orifice 108B (and may move in the opposite direction).

In FIG. 1, a state before the vibration absorption device 10 of the present exemplary embodiment supports the weight of the engine at the vehicle body (an unweighted state) is illustrated. Herebelow, this state is referred to. In FIG. 2, a state in which the vibration absorption device 10 is joined and fixed to the vehicle body and the engine, and the weight of the engine acts thereon, (a loaded state) is illustrated.

In the unloaded state of the vibration absorption device 10, as can be seen from FIG. 1, the inner side joining portion 24B is disposed relatively upward of the outer side joining portion 24A, that is, in the opposite direction to a direction of loading (the direction of Arrow F1). In the loaded state of the vibration absorption device 10, as illustrated in FIG. 2, due to the weight acting from the engine, the region between the outer side joining portion 24A and the inner side joining portion 24B is compressed and extends in a substantially horizontal direction (a direction orthogonal to the axis S) from the inner side joining portion 24B to the outer side joining portion 24A. That is, in the vibration absorption device 10 of the present exemplary embodiment, the shape of the rubber elastic body 18 in the unloaded state (particularly the angle of protrusion of the region reaching from the inner side joining portion 24B to the outer side joining portion 24A) is determined taking account of the load from the engine such that the region between the outer side joining portion 24A and the inner side joining portion 24B will be substantially horizontal in the loaded state.

Hence, in the vibration absorption device 10 that has been joined and fixed to the vehicle body and the engine, when the attached engine operates, vibrations from the engine are transmitted to the first rubber elastic body 24. At this time, the first rubber elastic body 24 acts as a main vibration-absorbing body and input vibrations are absorbed by a damping action due to internal friction and the like in accordance with deformation of the first rubber elastic body 24.

Now, as the main vibrations inputted from the engine to the vibration absorption device 10, vibrations generated by reciprocating movements of pistons in cylinders inside the engine (primary vibrations) and vibrations caused by changes in the rotation speed of a crankshaft inside the engine (secondary vibrations) can be mentioned. If the engine is an in-line straight engine, the amplitude direction of the primary vibrations (the primary amplitude direction) substantially coincides with the up-down direction of the vehicle, and the amplitude direction of the secondary vibrations (the secondary amplitude direction) substantially coincides with the front-rear direction of the vehicle (if the engine is laterally arranged) or the left-right direction (if the engine is longitudinally arranged), which are orthogonal to the amplitude direction of the primary vibrations. Whether input vibrations are the primary vibrations along the primary amplitude direction or the secondary vibrations along the secondary amplitude direction, the first rubber elastic body 24 may absorb the vibrations by the damping action due to internal friction and the like.

In the vibration absorption device 10, the primary chamber 42 communicates with the secondary chamber 44 through the first orifice 66. Thus, when the primary vibrations along the primary amplitude direction are inputted from the engine, the first rubber elastic body 24 elastically deforms along the primary amplitude direction and the internal volume of the primary chamber 42 expands and contracts. Accordingly, the liquid flows reciprocally through the first orifice 66 between the primary chamber 42 and the secondary chamber 44.

The path length and cross-sectional area of the first orifice 66 are specified so as to correspond with a frequency of bounce vibrations. Therefore, when the input primary vibrations are bounce vibrations, resonance (liquid column resonance) occurs in the liquid that is reciprocally flowing through the first orifice 66 between the primary chamber 42 and the secondary chamber 44 in synchrony with the input vibrations. Therefore, bounce vibrations that are inputted along the primary amplitude direction may be effectively absorbed by pressure changes and viscous resistance in the liquid in accordance with the liquid column resonance.

In the vibration absorption device 10 of the present exemplary embodiment, if the frequency of the inputted primary vibrations is higher than a frequency of shake vibrations and the vibrations are small, for example, if the input vibrations are idling vibrations (for example, 20-30 Hz) with an amplitude of the order of 0.1 mm to 0.2 mm, the first orifice 66, which is tuned to correspond with shake vibrations, goes into a clogged state and it is hard for the liquid to flow in the first orifice 66. However, because the movable plate 68 vibrates along the axial direction in synchrony with the input vibrations, a rise in the dynamic spring constant in accordance with a rise in liquid pressure in the primary chamber 42 may be suppressed. Thus, even during input of these higher frequency vibrations, the dynamic spring constant of the first rubber elastic body 24 may be kept low and the high frequency vibrations may be effectively absorbed by elastic deformation of the first rubber elastic body 24 and the like.

In the vibration absorption device 10 of the present exemplary embodiment, the pressure receiving chambers 102A and 102B reciprocally communicate with the secondary chamber 44 through the second orifices 108A and 102B. Therefore, when the secondary vibrations along the secondary amplitude direction are inputted to a mounting fixture 26 from the engine, the first rubber elastic body 24 elastically deforms along the secondary amplitude direction and the internal volumes of the pressure receiving chambers 102A and 102B expand and contract. As a result, the liquid reciprocally flows between the pressure receiving chambers 102A and 102B and the secondary chamber 44 through the second orifices 108A and 108B.

The path lengths and cross-sectional areas of the second orifices 108A and 108B are specified so as to correspond with a particular frequency selected from the range 5 Hz to 20 Hz for vibrations along the secondary amplitude direction. Therefore, if inputted secondary vibrations include this particular frequency, resonance occurs in the liquid reciprocally flowing between the pressure receiving chambers 102A and 102B and the secondary chamber 44 through the second orifices 108A and 108B. Thus, vibrations at that particular frequency that are inputted along the second amplitude direction are particularly effectively absorbed by changes in pressure, viscous resistance and the like in accordance with the resonance of the liquid.

In the vibration absorption device 10 of the present exemplary embodiment, excessive movement of the rubber elastic body 18 upward is limited by the bound stopper 36. The bound stopper 36 may be structured at low cost by extending the rubber structuring the rubber elastic body 18 upward and integrally vulcanizing and covering the broad diameter portion 21 of the upper mounting fitting 20A with the cover portion 25.

In the present exemplary embodiment, as can be seen from FIG. 1, both the first rubber elastic body 24 and the second rubber elastic body 38 are extended downward from the mounting fitting 20 toward the outer cylinder fitting 12. Therefore, while removal from a die during molding (what is known as mold release) would be difficult if the rubber elastic body 18 were a single member rather than the first rubber elastic body 24 and the second rubber elastic body 38 having a divided form, removal from the die is easier with the form that is divided in two as in the present exemplary embodiment.

If the rubber elastic body 18 were structured by a single body of rubber, then, for example, the dividing wall portion 23 or the like dividing the pressure receiving chambers 102A and 102B would have a smaller thickness and it would be necessary to prevent a fall in durability with respect to the action of weight and the like. By contrast, in the present exemplary embodiment, the rubber elastic body 18 is given the form that is divided into the first rubber elastic body 24 and the second rubber elastic body 38 from the beginning. Moreover, the dividing wall portion 23 dividing up the second pressure receiving chamber 32 is structured integrally with the first rubber elastic body 24 but is a separate body from the second rubber elastic body 38. Therefore, even if vibrations such that the dividing wall portion 23 deforms greatly are inputted to the vibration absorption device 10 from the engine, the dividing wall portion 23 deforms relatively freely and concentrations of stress at particular locations are moderated. Fatigue is less likely to arise in the dividing wall portion 23, and durability of the vibration absorption device 10 is improved accordingly. That is, a portion that causes concern about a fall in durability is no longer present, and the effect on durability of the vibration absorption device 10 is reduced.

In the present exemplary embodiment, the dividing wall portion 23 that is structured integrally with the first rubber elastic body 24 is nipped and retained from the two outside faces thereof by the retention portions 27 that are structured integrally with the second rubber elastic body 38. Therefore, susceptibility of the dividing wall portion 23 to being damaged by deformation of the dividing wall portion 23 or the like may be suppressed.

Figure 4:
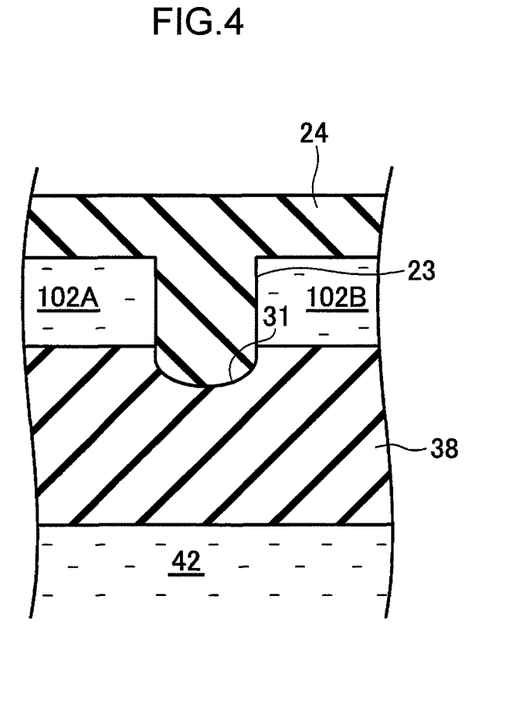
FIG. 4 shows a sectional diagram illustrating, in the same section as FIG. 3, a joining structure between the first elastic body and the second elastic body relating to a variant example of the vibration absorption device of the exemplary embodiment of the present invention.

In the present exemplary embodiment, the two outside faces of the dividing wall portion 23 are nipped by the retention portions 27. However, as illustrated in FIG. 4, a structure is possible in which the distal end of the first rubber elastic body 24 has an arc form and is inserted into a groove 31 structured in the first elastic body 22. In this case too, the distal end portion of the dividing wall portion 23 is retained, by the inner walls of the groove 31. Thus, while a degree of freedom of deformation of the first rubber elastic body 24 is maintained, concentrations of stress at particular locations by deformation may be moderated.

In the above description, an example is given in which the dividing wall portion 23 is formed at the first rubber elastic body 24 and the lower end of this dividing wall portion 23 is abutted against the second rubber elastic body 38. A structure is possible instead in which the dividing wall portion is formed at the second rubber elastic body 38 and the upper end of this dividing wall portion is abutted against the first rubber elastic body 24. In an vibration absorption device in which the dividing wall portion is formed at the second rubber elastic body 38 thus, retention portions that retain the upper end portion of the dividing wall portion are provided at the first rubber elastic body 24.

The invention claimed is:

1. A vibration absorption device comprising:
a first mounting member joined to one of a vibration generating portion or a vibration receiving portion, the first mounting member being formed in a substantially tubular shape;
a second mounting member joined to the other of the vibration generating portion or the vibration receiving portion, the second mounting member being disposed at an inner periphery side of the first mounting member;
a first elastic body elastically joined to the first mounting member and the second mounting member;
a second elastic body disposed between the second mounting member and the first elastic body;
a pair of pressure receiving chambers arrayed in a direction orthogonal to an axial direction of the first mounting member, between the first elastic body and the second elastic body, liquid being sealed in the pressure receiving chambers and internal volumes thereof changing in accordance with elastic deformations of the first elastic body;
a primary chamber in which liquid is sealed, a portion of a dividing wall thereof being structured by the second elastic body;
a secondary chamber, a portion of a dividing wall of which is structured by a diaphragm member and in which liquid is sealed, an internal volume of the secondary chamber being capable of expanding and contracting in accordance with changes in liquid pressure;
a partition member provided between the primary chamber and the secondary chamber;
a first restriction channel that enables movements of liquid between the primary chamber and the secondary chamber;
a second restriction channel that enables movements of liquid between each of the pressure receiving chambers and the secondary chamber;
a dividing wall portion that is disposed along a radial direction of the first mounting member, that is structured integrally with one of the first elastic body or the second elastic body, and that divides up a cavity between the first elastic body and the second elastic body and structures the pair of pressure receiving chambers; and
a retention portion that is structured integrally with the other of the first elastic body or the second elastic body and that abuts so as to enclose the outer sides of the dividing wall portion,
wherein in an unloaded state, in which the first mounting member and the second mounting member are not joined to the vibration generating portion and the vibration receiving portion, an inner side joining portion that is a region of joining to the second mounting member of the first elastic body is disposed, relative to an outer side joining portion that is a region of joining to the first mounting member of the first elastic body, at the opposite direction to a direction of loading in a loaded state, in which the first mounting member and the second mounting member are joined to the vibration generating portion and the vibration receiving portion.

2. The vibration absorption device according to claim 1, wherein an extension angle in the unloaded state of a region of extension of the first elastic body, which extends from the inner side joining portion to the outer side joining portion, is determined such that the region of extension is orthogonal to the axial direction of the first mounting member in the loaded state.

3. The vibration absorption device according to claim 1, further comprising:
a broad diameter portion that is provided at the second mounting member and broadens in diameter to the radial direction outer side at the opposite side of the second elastic body from the side thereof at which the diaphragm member is disposed; and
a cover portion that is continuous from the first elastic body and covers the broad diameter portion.

4. The vibration absorption device according to claim 1, wherein the dividing wall portion is a ridge along the radial direction, and the retention portion is two ridge portions along the radial direction that sandwich the dividing wall portion from width direction outer sides of the dividing wall portion.

5. The vibration absorption device according to claim 1, wherein the dividing wall portion is a ridge along the radial direction with an arc-shaped cross-section, and the retention portion is a recessed groove along the radial direction with an arc-shaped cross-section that corresponds with a distal end portion of the dividing wall portion.

6. The vibration absorption device according to claim 1, wherein the second elastic body is lower in hardness than the first elastic body.

* * * * *